May 12, 1964 W. HARRIES 3,133,242

STABILIZED D.C. AMPLIFIER POWER SUPPPLY

Filed Oct. 28, 1960

INVENTOR.
WOLFGANG HARRIES

BY E. A. Petko

ATTORNEY 3,133,242
Patented May 12, 1964

3,133,242

STABILIZED D.C. AMPLIFIER POWER SUPPLY

Wolfgang Harries, Hazlet, N.J., assignor to Electronic Associates Inc., Long Branch, N.J., a corporation of New Jersey Filed Oct. 28, 1960, Ser. No. 65,753
6 Claims. (Cl. 323—22)

This invention relates generally to stabilized power supplies and more particularly to such power supplies with high precision for use in computer application.

Precisely controlled supply voltages are required in analog computer applications in order to prevent the occurrence of computing errors. Various regulation schemes, such as comparing a portion of the power supply output with a highly stable reference source for producing error signals which effect corrective action have been proposed, but the usual quality of regulation obtained is no better than the quality of the reference used. The use of standard cells as a voltage reference has been by far the most satisfactory approach to producing accurately controlled voltages. However, decay of the quality of the standard cell, which is generally brought about by extended use, or by rough handling, or by periodic exposure to damaging currents requires periodic replacement of the cells and allows for improvements in their use.

Accordingly, it is an object of the present invention to provide a highly stable and accurate voltage source which is virtually indestructible and which will maintain its accuracy through extended usage.

Briefly stated in accordance with the preferred embodiment of the present invention, an accurate and highly stable voltage reference is obtained by the use of a unidirection conducting device, such as a Zener diode, as a voltage reference for a power supply which comprises a pair of D.C. amplifiers and a feedback circuit. The amplitude of the input current for the pair of amplifiers and the current passing through the diode is accurately stabilized through the feedback circuit to render the output potentials from the power supply independent of load variations throughout the linear range of the amplifiers.

Figure 1:
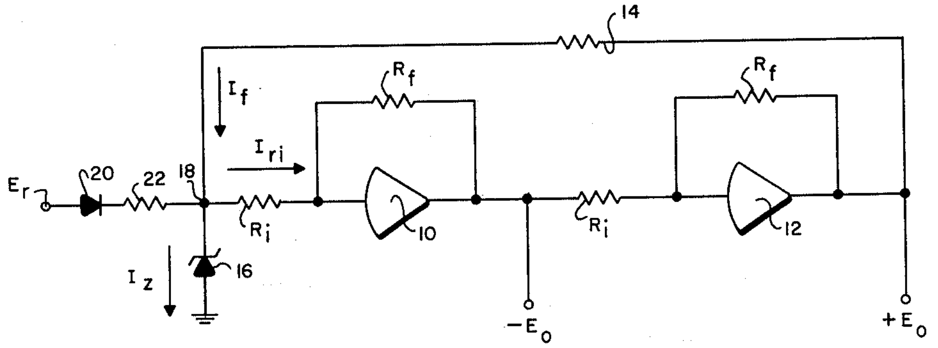
Figure 2A:
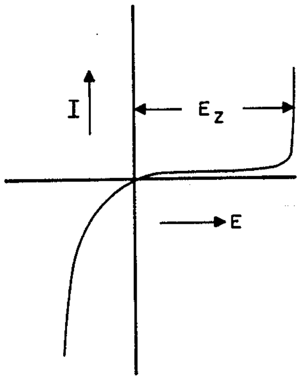
Figure 2B:
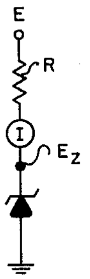

These and other objects, features and advantages will become apparent from the following description of a preferred embodiment of the present invention taken in connection with the accompanying drawing wherein:

FIG. 1 is a schematic representation of the preferred embodiment of the present invention;

FIG. 2*a* is a typical characteristic curve of the voltage reference used in the embodiment of FIG. 1; and FIG. 2*b* is a circuit diagram which will aid in the understanding of FIG. 2*a*.

Referring now to the drawing, it may be seen that the stabilized power supply of this invention includes a pair of serially connected amplifiers 10 and 12, a feedback circuit including a resistor 14 which interconnects the output circuit of the amplifier 12 with the input circuit of the amplifier 10, and an asymmetrical conducting device 16 which is connected to the juncture 18 of feedback circuit 14 and the input circuit of amplifier 10.

Each of the amplifiers 10, 12 preferably has a wide band, high gain characteristic and may be stabilized by suitable means, such as the well known chopper stabilization circuit, the details of which are not essential to an understanding of the present invention. Each amplifier is provided with an input resistor $R_i$ connected to its input terminal for delivering an input signal thereto and with a feedback resistor $R_f$ connected between its input and output terminals. Amplifier 10 has the free end of its input resistor $R_i$ connected directly to the juncture 18; the free end of the input resistor $R_i$ for amplifier 12 is connected directly to the output terminal of amplifier 10.

By the arrangement of their respective feedback and input resistors, the amplifiers 10 and 12 are operated degeneratively to maintain their input terminals substantially at ground potential and to produce an output potential $E_o$ which is linearly related to an analog input potential $E_i$ applied to the respective input resistor $R_i$ according to the well known expression $$E_o = -\frac{R_f}{R_i}E_i \tag{1}$$

From the equation it should be apparent that the output signal from each amplifier is completely independent of variations in the amplifier power supplies, not shown. Moreover, the amount of gain imparted to an input signal $E_i$ by either amplifier may be varied by varying the respective ratio of $R_f$ to $R_i$.

The asymmetrical conducting device 16 preferably comprises a Zener diode, the well known typical characteristic of which is illustrated in FIG. 2*a*. Diode 16 is connected between a point of fixed reference potential such as ground and the junction 18. This diode, operating in conjunction with the feedback circuit 14, provides a fixed amplitude stabilized voltage reference for the power supply of the present invention.

The typical Zener characteristic of FIG. 2*a* is best understood by now referring to FIG. 2*b*. In FIG. 2*b* a Zener diode is shown to have its anode element connected to a point of ground potential and to have its cathode element connected to a source of variable amplitude potential E via a series circuit arrangement of a resistor R and an ammeter I. As the potential from the source E is varied in amplitude in a positive or in a negative direction, the current at the ammeter I is seen to increase rapidly after the applied potential has increased beyond some predetermined amplitude. The amplitude of positive potential $E_z$ which will cause the diode element to conduct is hereinafter referred to as the Zener breakdown potential. During conduction of the diode, the Zener breakdown potential appearing across the diode is ideally considered to be substantially independent of variations in the current passing through the diode.

Assuming by way of example that the present Zener diode 16 conducts when $E_z$ is equal to plus 10 volts, it is apparent that plus 10 volts will be applied via the resistor $R_1$ to the input terminal of the amplifier 10. If, for example, it is desired to obtain minus 12 volts at the output terminal, $-E_o$, of this amplifier, the input and feedback resistors for amplifier 10 must be related by the ratio of 10 to 12. The potential appearing at the output terminal $-E_o$ is applied to the amplifier 12 as an input signal, and if, the ratio of $R_i$ to $R_f$ for amplifier 12 is selected to be unity, the output signal at terminal $+E_o$ will be +12 volts. The output signals appearing at terminals $-E_o$, $+E_o$ are suitable for application to a power consuming device and are maintained accurately within a range of variations determined only by the accuracy of the input and feedback resistors $R_i$ and $R_f$ and the accuracy of the voltage drop across the Zener diode 16.

As stated previously, the characteristic of a particular Zener diode is independent of the current passing through it only in an idealized situation. In the usual practical case, some nonlinearities or deviations exist because of temperature variations at the diode and because of variations in the magnitude of current passing through the diode. The deviations caused by temperature variations can be admirably overcome by placing the diode in a temperature controlled oven or the like. In order to eliminate effects of current variations through the diode, the current drawn through this diode must be accurately maintained. According to the present invention, the feedback circuit 14 operates to this end.

Assume, in the present example, that the output signal at terminal $+E_o$ is of a greater amplitude than is the $E_z$ of the particular Zener diode being used. To produce this particular $E_z$, a particular current designated $I_z$ must pass through the diode. In order to produce the desired output potentials, at $-E_0$ and $+E_0$, some particular input current $I_{ri}$ must pass through the input resistor $R_i$ for the amplifier 10.

From Kirchhoff's laws, an equation for the currents occurring at the junction 18 may be written as follows:

$$I_f = I_{ri} + I_z \quad (2)$$

where $I_f$ is the current obtained via the resistor 14. The current $I_{ri}$ as well as the current $I_f$ are independent of the load currents drawn from the terminals $-E_0$ and $+E_0$ within the linear range of the amplifiers 10 and 12. Thus, from Equation 2 and Ohm's law, with accurate selection of the feedback resistor 14, the feedback current $I_f$ can be accurately maintained throughout the linear operating range of the amplifiers 10 and 12 to accurately maintain the input current $I_{ri}$ and the Zener current $I_z$. With this arrangement, the output potentials appearing at terminal $-E_0$ and $+E_0$ are maintained to the accuracies of the resistors $R_i$, $R_f$, and 14.

Since initially the Zener diode of the present invention can stabilize, viz., conduct, in either direction (positive or negative) at different amplitudes of potential, a starter diode 20 is connected to the juncture 18 to insure diode conduction in only one direction. A positive current is applied to the juncture 18 from a suitable source of potential $E_r$ through a resistor 22 via the diode 20 in order to properly polarize the output signals from the amplifiers 10 and 12. A positive input signal obtained via the feedback resistor 14 will add to the positive input signal obtained via the diode 20 and will cause the output voltages at terminal $+E_0$ and $-E_0$ to increase in amplitude until such time as the diode 16 conducts. At this occurrence, the input signal appearing at juncture 18 will be limited in amplitude, and the output voltages at terminal $+E_0$ and $-E_0$ will be accurately stabilized. In addition, the diode 20 will be back or reverse biased by the input signal then appearing at the juncture 18 to draw only a negligible current from the juncture.

While only one embodiment of the present invention has been shown and described herein and inasmuch as this invention is subject to many variations, modifications, and reversals of parts, it is intended that all matter contained herein be interpreted as illustrative and not in a limiting sense.

I claim:

1. A stabilized direct current power supply including a pair of serially connected direct current amplifying means, a Zener diode connected between an input terminal of one of said amplifying means and a point of fixed reference potential, a regenerative feedback circuit connected from the output terminal of the other of said amplifying means to the input terminal of the one said amplifying means, means for applying to said input terminal a starting signal of polarity for biasing said Zener diode only to a condition of conduction in its reverse direction and of magnitude of potential less than the magnitude of the Zener breakdown voltage whereby said feedback circuit is effective to increase the magnitude of said potential at said input terminal until said Zener breakdown is reached.

2. A stabilized direct current power supply including a pair of serially connected direct current amplifying means, a Zener diode connected between an input terminal of one of said amplifying means and a point of fixed reference potential, a regenerative feedback circuit connected from the output terminal of the other of said amplifying means to the input terminal of the one said amplifying means, and means for applying to said input terminal a signal which biases said Zener diode only to a condition of reverse conduction and of magnitude of potential less than the magnitude of the Zener breakdown voltage whereby said regenerative feedback circuit is effective to increase the magnitude of said potential at said input terminal until the Zener breakdown region is reached thereby to provide an accurately stabilized input signal for said one amplifying means.

3. A stabilized direct current power supply including a pair of serially connected D.C. amplifiers each having an input terminal and an output terminal for applying a reference voltage to a load, means applying a starting potential to the input terminal of one of said amplifying means for establishing an initial condition at the output terminals of said pair of amplifying means, a Zener diode having a breakdown potential greater in magnitude than said starting potential and being connected between a point of fixed potential and the input terminal of said one amplifying means, and a regenerative feedback path including a resistance element connected between the output terminal of the other said amplifying means and the input terminal of said one amplifying means for rendering said potential applying means ineffective and for biasing said Zener diode to a condition of reverse conduction thereby to accurately limit in value the input potential applied to said one amplifying means.

4. A stabilized power supply according to claim 3 wherein said potential applying means includes a diode element which, after establishment of the initial condition, is reverse biased by the signal delivered along said regenerative feedback path.

5. A direct current power supply having the magnitude of its output potential accurately stabilized comprising, at least one pair of serially connected direct current amplifying means, a Zener diode connected between an input terminal of a first of said pair of amplifying means and a reference potential point, a regenerative feedback circuit connected between an output terminal of a second of said pair of amplifying means and said input terminal of said first amplifying means, and means for applying to said input terminal a starting signal of polarity to bias said Zener diode for flow of current therethrough only in a reverse direction and of magnitude of potential less than the magnitude of the Zener breakdown potential whereby said regenerative feedback circuit is effective to increase the magnitude of said potential at said input terminal until said Zener breakdown potential is reached to accurately limit the magnitude of the potential at said input terminal thereby accurately to stabilize the magnitude of the output potential provided at each of the output terminals of said first and said second amplifying means.

6. The power supply of claim 5 in which an input means includes a starting diode which is reverse biased when said potential at said input terminal increases beyond said starting potential to isolate said input means from said input terminal.

References Cited in the file of this patent

UNITED STATES PATENTS

| | | |
|---|---|---|
| 2,714,702 | Shockley | Aug. 2, 1955 |
| 2,716,729 | Shockley | Aug. 30, 1955 |
| 2,869,068 | Morcerf et al. | Jan. 13, 1959 |
| 2,885,494 | Darlington et al. | May 5, 1959 |
| 2,983,880 | McFadden | May 9, 1961 |